Oct. 8, 1963    H. A. SCHWAN ETAL    3,106,519
REACTOR CONTROL ROD DRIVE MEANS
Filed July 28, 1959    3 Sheets-Sheet 3
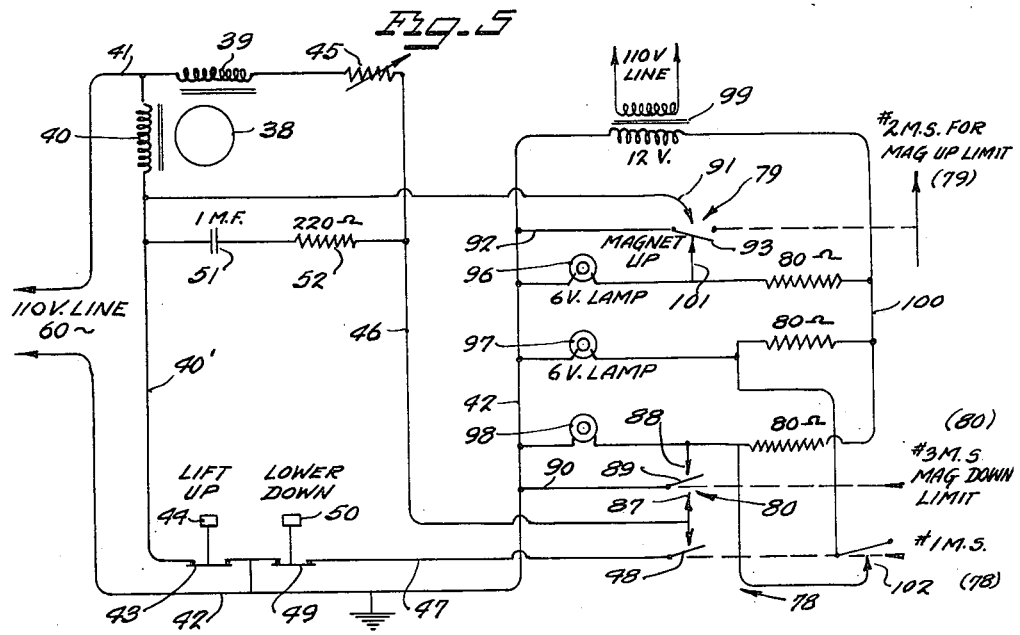
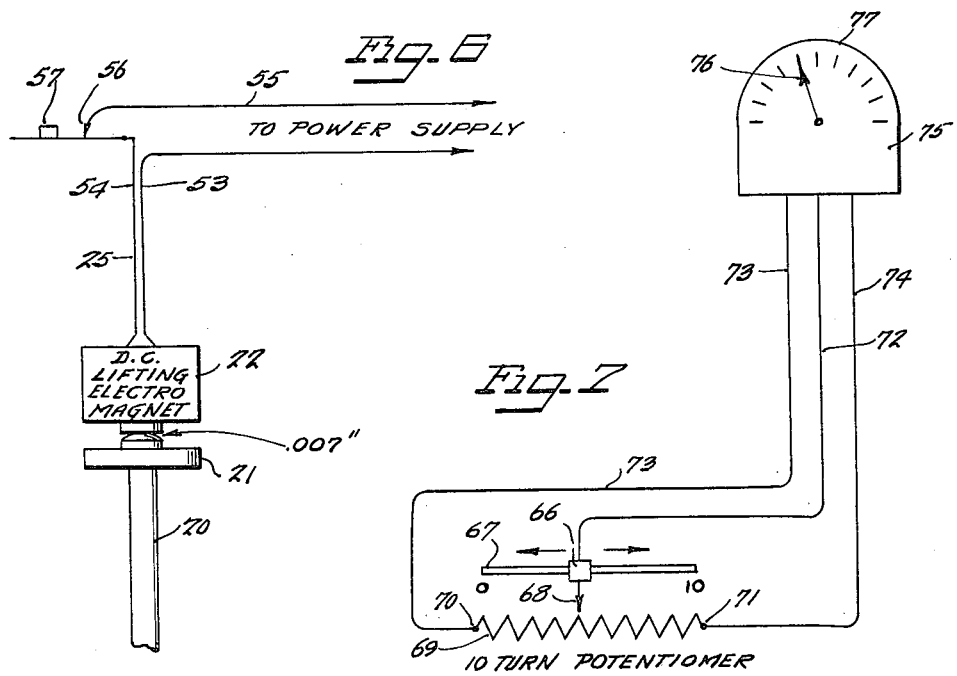
Inventors
HERBERT A SCHWAN
HAROLD A THOMAS
By Soans, Anderson,
Luedeka & Fitch Atty's

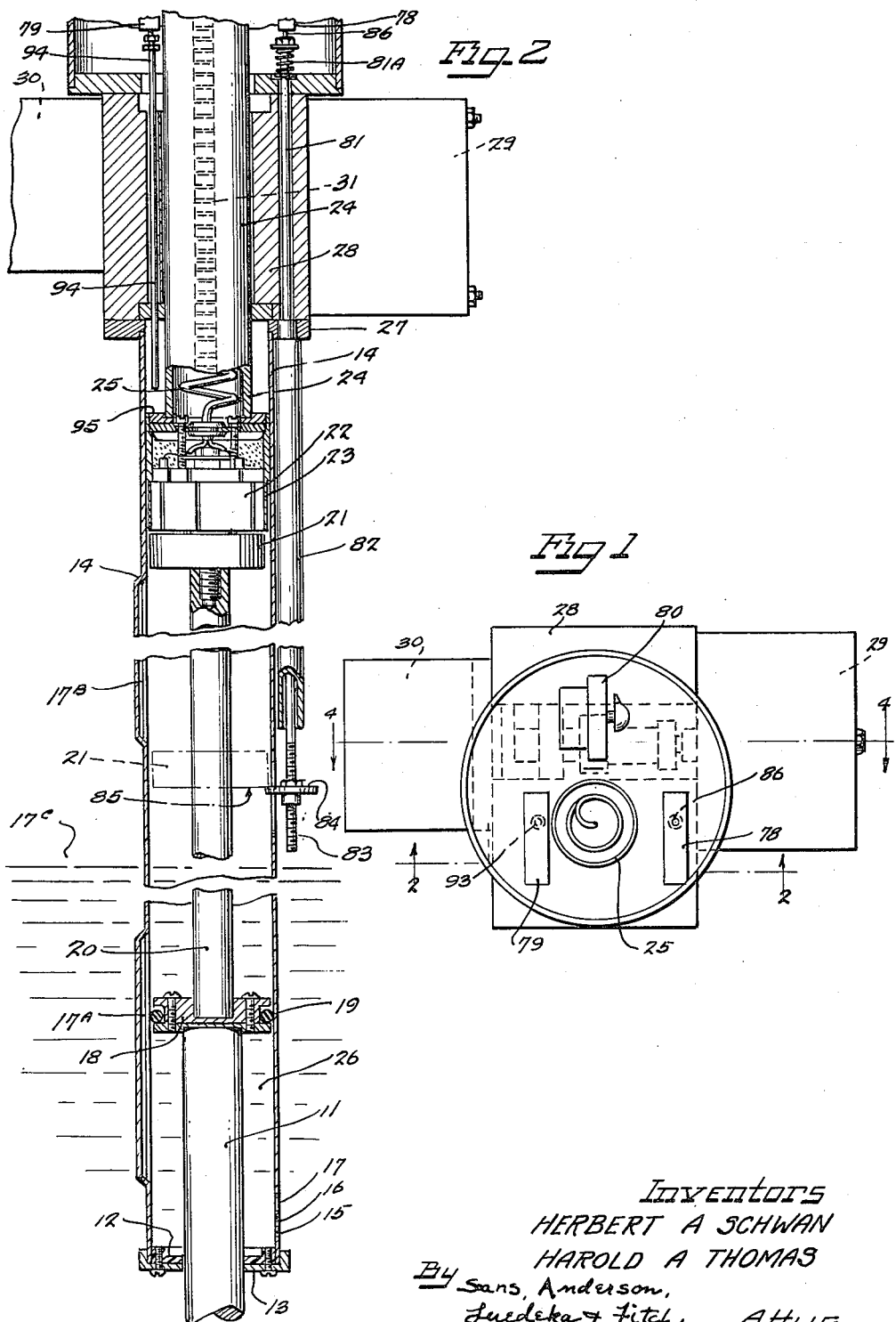

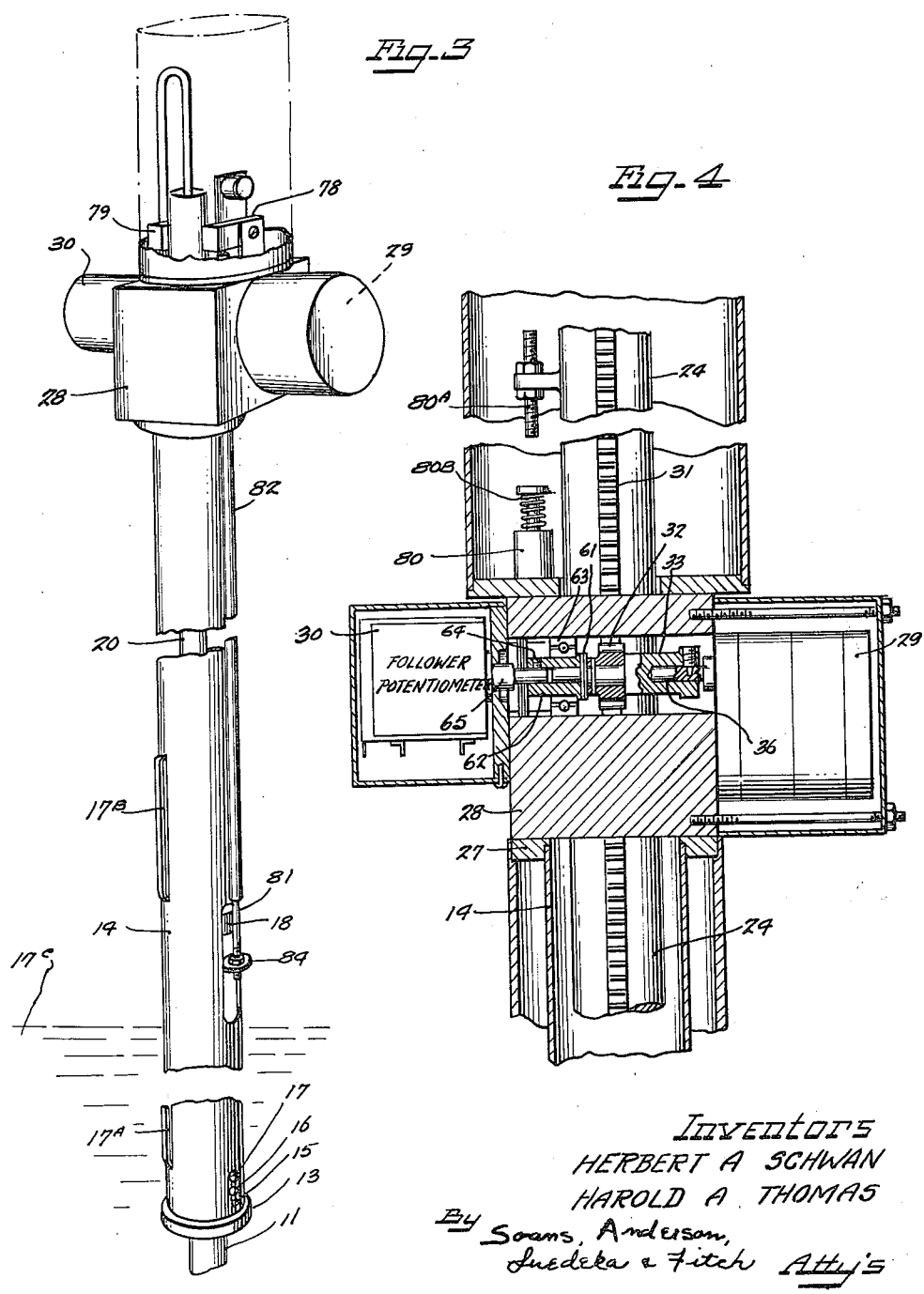

United States Patent Office 3,106,519
Patented Oct. 8, 1963

3,106,519
REACTOR CONTROL ROD DRIVE MEANS
Herbert A. Schwan, Encinitas, and Harold A. Thomas, San Diego, Calif., assignors to General Dynamics Corporation, New York, N.Y., a corporation of Delaware
Filed July 28, 1959, Ser. No. 830,050
5 Claims. (Cl. 204—193.2)

This invention relates to improvements in reversible drive mechanism. It is of particular value in connection with remote control drive mechanisms which are used to adjust an element of an operating device so as to locate it in various settings or positions of rest selected at will by the operator at a remote control point. For example, the arrangement is of especial value in positioning a control rod used in a nuclear reactor or other device where it is not desirable or feasible to station the operator at or adjacent to the place where the device controlled, for example a nuclear reactor, has a controlling element which is to be set or adjusted from time to time according to various requirements of the device.

In such devices, and particularly in the case of nuclear reactors, the control rod which is usually vertical must be adjusted inwardly or outwardly, in this case up or down, in the core of the reactor, in order to enable the nuclear reaction to take place at the desired rate and in addition, in an emergency, means must usually be provided to rapidly insert or drop the control rod into the core to prevent the reactor from attaining dangerous power levels.

With such devices as have been mentioned, and particularly in the case of a reactor, the reaction may continue at a constant level without adjustment over a long period of operation. If so, it may not be necessary to make frequent adjustments in the position of the control rod, especially in the case of a nuclear power reactor where the power output may be held constant. However, it is desirable that means should be provided to adjust the control rod at the start and at the end of the run and sometimes during a long run as conditions or requirements change from time to time. Furthermore, it is necessary that the operation should be monitored and that when a dangerous condition suddenly develops in the reactor, the control rod must be dropped promptly to its bottom level in the reactor so as to stop the reaction, without having to depend upon the rod position regulating mechanism, or until it has time to operate. For this reason, a nuclear reactor is often equipped with an automatic monitoring device which promptly detects the possibility of an impending disaster and also triggers a device which disconnects the control rod from the normal adjusting mechanism and causes the control rod to drop forthwith to the bottom level in the core and check the reaction.

The reactor control rods are usually hung in a vertical position. Since the weight of the rod and its associated lifting accessories is considerable, the control rod, under normal conditions, under the force of gravity tends to drift down into the core. This drift due to gravity would require the operator to be constantly adjusting the position of the rod in the reactor in order to obtain and maintain the desired rate of reaction. The use of mechanical brakes or other means in order to introduce enough friction to prevent such drift, tends to introduce certain risks and complications which are undesirable.

In view of the foregoing, it will be understood that one of the principal objects of the invention is to provide an electrical apparatus and system of driving a positioning device of the class described, which is fully reversible and is designed to hold the controlled element in any desired position of adjustment which is selected by the operator, and which will maintain said adjusted or rest position without frequent readjustment, and which will inherently compensate for any unidirectional drift or force acting upon the element.

Another object of the invention is to provide a mechanism which in case of emergency will enable the controlled element to be substantially instantaneously disconnected from the rod driving mechanism so that a unidirectional force such as gravity may be available to rapidly propel the element to an emergency or other rest position without any significant delay due to the operation of the normal adjustment mechanism, or in the event that the normal adjusting mechanism fails to operate for any reason.

A further object of the invention is to provide an improved monitoring system or apparatus of the character described which may be operated efficiently and safely by remote control.

Other features and objects will become apparent as the description proceeds. In connection with the description, reference may be had to the accompanying drawings which illustrate the arrangements for adjusting the position of a control rod in an atomic or nuclear reactor. In said drawings:

FIGURE 1 is a plan view of the operating mechanism;

FIGURE 2 is a section taken on the line 2—2 of FIGURE 1;

FIGURE 3 is a perspective view of the mechanism shown in FIGURES 1 and 2;

FIGURE 4 is a section taken on the line 4—4 of FIGURE 1;

FIGURE 5 is a schematic diagram of the various electrical connections employed in the rod-driving mechanism;

FIGURE 6 is a schematic diagram of the electrical connections for the coupling magnet; and FIGURE 7 is a schematic diagram of the monitoring potentiometer employed in informing the remote control operator as to the position of the control rod.

The control rod illustrated is designed for use in a reactor which includes a reactor tank or shell filled with a liquid fluid neutron moderating material, and a reactive core within the fluid neutron moderating material. Referring to the drawings, the numeral 11 represents a connecting rod to the lower end of which there is attached a body of neutron absorbing material, preferably in rod form, which serves to control or slow down the reaction when the body is lowered into the reactive core of the reactor. The upper end of said connecting rod 11 extends through a suitable gland 12 in the lower end 13 of an axially vertical barrel or cylinder 14 in the lower end of which a set of graduated orifices such as 15, 16 and 17 serve to permit fluid to escape from the lower end of the cylinder 14. Above these graduated orifices narrow vertical slots such as 17a and 17b are provided in the wall of the barrel. The lower slots 17a permit the fluid to pass in and out of the barrel below the fluid level 17c and the upper slots 17b serve to equalize the air pressure in the upper end of the barrel. The lower end of the barrel 14 extends down below the level of the fluid which occupies the reactor tank in which the reactive core is housed, and the upper end of the barrel extends upwardly above the said fluid level.

The upper end of the connecting rod 11 is secured to a piston 18 freely slidable in the bore of the cylinder 14 and having also an expansible ring 19 forming a loose seal or guide between the piston 18 and the cylinder 14. To the top of the piston 18 there is secured a stem 20 which is, in effect, an extension of the connecting rod. The upper end of the stem 20 is connected to a head or armature 21 of iron or similar magnetic material, which is a sufficiently loose fit within the cylinder 14 so that it will slide up and down freely therein.

Normally, the armature 21 is magnetically held against the lower end of a magnet 22 in a cylindrical jacket 23 which is freely slidable within the bore of the cylinder 14. Said magnet 22, which is preferably of the direct current lifting type, is secured to the lower end of a draw tube 24 and has a conventional winding to which current is supplied by a flexible, helical, two-conductor cable 25, contained within the draw tube 24. In the normal day-to-day operation of the device, direct current is continuously supplied through the cable 25 to the coil within the magnet 22, so that the armature 21 is held tightly against the lower end of the magnet 22. Hence, the connecting rod 11, its extension 20 and the draw tube 24 are normally connected together to move as a single unit within the stationary cylinder 14. However, when the supply of magnetizing current through the cable 25 to the magnet 22 is interrupted, the armature 21 will be uncoupled from the magnet 22 and consequently, the stem 20, and with it the connecting rod 11, will drop by gravity. The control rod will thus drop all the way down into the core of the reactor. Because of the length of the rod string and the barrel, when the connecting rod 11 is in its lowest position, the magnet 22 and also the armature 21 will still remain a sufficient distance above the fluid level so that neither the fluid nor the proximity of the reactive core will interfere with the proper functioning of the magnet or other parts associated with it.

By reason of the fact that the connecting rod 11 extends down through the sealing gland 12 at the bottom of the cylinder 14, and the upper end of the connecting rod 11 is fastened to the piston 18, which is also sealed by the ring 19, the fluid 26 will be compressed in the cylinder 14. However, such fluid will be discharged only through the throttling openings 17, 16 and 15 previously mentioned. These graded openings serve to relieve the pressure of the water 26 in the cylinder quite rapidly during the early portion of the descent of the piston 18, which rate of descent will be reduced by the throttling effect of the discharge orifices. The large upper orifice 17 in the cylinder, the intermediate hole 16 and the smallest and lowest hole 15 thus provide an escape for water from the cylinder 14 and also serve as a controlling means to reduce the rate of descent of the control rod as the piston approaches the bottom of the cylinder.

As shown best in FIGURE 4, the upper end of the barrel or cylinder 14 is secured in an annular flange 27 on the lower end of a block 28, which serves as a stationary base for supporting an induction motor 29 and a potentiometer 30, which is geared to the draw tube 24, as will later appear.

A draw tube 24 which elevates the magnet 22 has an upper end which extends upwardly and vertically through a vertical channel bored in the block 28 (see FIGURE 2) and it extends upwardly beyond the block 28 a sufficient distance to accommodate a rack 31 (see FIGURE 4) extending longitudinally and vertically along, and carried on the exterior of, the draw tube 24. The rack 31 is engaged by a pinion 32 fixed on the end of an axially horizontal stub shaft 3, and having its right hand end connected to the power take-off shaft 36 of the motor 29. Said shaft 36 is rotated by the induction motor 29 through conventional reduction gearing at a speed of a few r.p.m., the induction motor being capable of a top speed of approximately 3500 r.p.m. By means of connections which will now be described, the motor may be driven in either direction so that the pinion 32 driven by the motor can elevate or lower the magnet tube 24 and the parts carried thereby in order to adjust the height of the rod string.

Referring now to FIGURE 5, which includes a schematic diagram of the motor controlling connections, the numeral 38 indicates the rotor of an induction motor of the squirrel cage type having conventional stator windings 39 and 40, and one end of each winding is connected to the live side 41 of a single phase, 60 cycle, A.C. power line. The other end of said winding 40 is connected through a line 40' to the cold side 42 of the power line through a normally closed, push-button switch 43 which may be opened by pressing the push-button 44 when it is desired to elevate the rod string. The other stator winding 39 of the motor is connected through an adjustable biasing resistance 45 to a line 46 which normally is connected to the line 47 through a normally closed contact 48 of a microswitch No. 1, later to be described. Said line 47 is connected to the cold side 42 of the power line by a normally closed switch 49 which may be opened by pressing on the push-button 50 when it is desired to lower the rod string. The lines 40' and 46 of the circuit are connected together through a shunt circuit which includes a condenser 51 and a resistance 52 in series therewith.

In the rest position, as shown in FIGURE 5, said shunt circuit which includes the condenser 51 and resistance 52 is normally short circuited by push-button switches 43 and 49 and the normally closed contact 48 of microswitch No. 1. Hence, when the circuit is at the rest position shown in FIGURE 5, the lines 40' and 46 from the windings 40 and 39 are directly connected to the side 42 of the power line. Under these conditions, except for the adjustable resistance 45, the coils 39 and 40 of the motor are balanced so that the field of the induction motor does not rotate, and consequently, no torque is applied by the motor 29 to the shaft 36. However, a selected rest position of adjustment of the rod string should be preferably maintained without having to use the "Up" button 44 from time to time to correct for the drift or creeping due to the weight of the rod string which is mechanically unbalanced. Since in devices of this sort there may be difficulties involved in mechanical braking, a way has been found to cause the induction motor when in rest position to deliver a biasing torque in one direction only, in a direction opposing the torque applied to the motor shaft by means of the gearing which connects the motor to the rod string.

To this end, it has been found that this desirable result can be accomplished, in the circuit shown in FIGURE 5, by interposing an adjustable resistance 45 between the line 46 and the stator coil 39 of the motor. This biasing resistance 45 which serves to create a slight difference in phase between the coils 39 and 40 is adjusted so that the rotor of the motor will develop a slight, but sufficient torque in the right direction to neutralize the slight torque in the contrary direction which is constantly applied to the pinion 32 by the rack 31. It will be understood that the slight torque due to the biasing resistance 45 does not interfere with the proper operation of the mechanism in effecting the up or down movement of the rod string into any desired position by manipulating the push-buttons 44 and 50.

When either of the push-buttons 44 or 50 is actuated, the short circuit between the lines 40' and 46 is opened, thus activating the bridging circuit which includes a condenser 51 and resistance 52. This activated bridging circuit will be placed in series with one only of the stater coils 40 and 39. Thus, when the "Up" button 44 is pressed down to open contact 43, the bridging circuit will be placed in series with the coil 40 which will cause the motor to rotate in the "up" direction. When the push-button 50 is depressed to open contact 49, current will have to find its way through said bridging circuit from the coil 39 to the cold side 42 of the power line and the motor will rotate in the "down" direction.

In this particular application of the invention, it is desirable to drop the control rod into the core of the reactor so as to obtain its full effect in checking the reaction in case of emergency, for example, if the rate of reaction builds up to a dangerously high level or in case of the development of any other condition that might result in a disaster if the rate of the reaction were not promptly reduced to a minimum safety level. In the present instance, this result is obtained by the use of a quick detachable magnetic connection or coupling between the magnet 22 at the lower end of the draw tube 24 and the armature 21 on the upper end of the stem 20.

The Magnetic Release Control

The circuit for accomplishing this result is illustrated in FIGURE 6. Referring to said diagram in FIGURE 6, it will be seen that the magnet 22 obtains magnetizing current from a pair of leads 53 and 54, the latter conductor 54 being connected to one side 55 of a power supply line through a normally closed switch 56. The other side of the power supply line is connected to the conductor 53. When the current is cut off from the magnet 22, the armature 21 will fall by gravity and the control rod will be lowered into the core. Any danger that the armature will stick to the magnet due to residual magnetism is avoided by slightly rounding the top face of the armature, as shown in FIGURE 6, so that there will be no metal-to-metal contact except at the center of the armature.

The numeral 57, which represents an actuating member for opening the contact 56 may be manually actuated by the operator when he observes that an emergency exists. Also, the construction of the reactor may be monitored by a conventional detecting device, provided with means for automatically shutting off the power supply when the monitoring device detects the emergency. (See U.S. patent to Zinn, No. 2,779,728, January 29, 1957.)

The Draw Tube Position Indicator

Referring again to FIGURE 4, it will be seen that the left hand face of the spur pinion 32 is connected by means of a suitable flexible coupling 61 to a hub 62 supported by a suitable bearing 63 for rotation in the horizontal bore of the block 28 in coaxial alignment with the axis of the stub shaft 33. This enables the pinion 32 to drive the hub 62 in synchronism with the shaft 33 so that the hub 62 will rotate at the same speed and maintain its angular position relative to the pinion 32 at all times.

Within a central bore in the left hand end of the hub 62 there is secured, by means of a set screw 64, a shaft 65 driving a 10 turn potentiometer of the follower type, illustrated diagrammatically in FIGURE 7, from which it will be seen that the follower indicated at 66 travels along the guide 67 so that a contact 68 will make contact with the 10 turn resistance element 69. The follower contact 66 and the ends 70 and 71 of the potentiometer element are connected by means of lines 72, 73 and 74 to a suitable meter, indicated diagrammatically at 75, and having a pointer 76, the position of which on the graduated height scale 77 is a reflection of the vertical position of the draw tube 24.

The Up and Down Limit Switches

The parts shown in FIGURES 2 and 4, and the circuit as shown in FIGURE 5, represent the condition of the apparatus and circuits when the reactor control rod has been adjusted to such height as to maintain the desired operating conditions in the reactor. That is to say, by operating the push-buttons 44 and 50 and observing various instruments which indicate and record the condition of the reactor, the system may be stabilized for the time being, and there is no occasion to make any further adjustment of the control rod of the reactor until some change occurs. However, it is advisable to make some provision for limiting the vertical movement of the rod assembly against damage due to over-adjustment of the up movement or the down movement of the rod train which might inflict damage upon some part of the equipment.

To this end, there are provided three microswitches, each of which is operated at the proper time by vertical movement of the rod train within the cylinder or barrel 14. These microswitches are designated under the No. 1, 2 (78 and 79, FIGURE 2) and 3 (80, FIGURES 1 and 4).

No. 1 Microswitch (78)

The operating means for microswitch 78 is a pull rod 81 extending downwardly along side of the barrel 14 through a tubular housing 82. Spaced below the bottom end of the housing 82 the lower end of the pull rod is threaded as shown at 83 to receive a pair of nuts between which there is clamped a disc or washer 84. As indicated in dotted lines at 85 in said FIGURE 2, when the armature 21 descends low enough so that its bottom edges engage the topside of the disc 84, the pull rod 83 will be drawn down and its upper end will actuate the arm 86 of the No. 1 microswitch so as to open up contact 48.

If we now assume that the excessive downward movement of the control rod has been due to the operator having kept the push-button 50 down with contact 49 open for an excessive length of time, the opening of the contact 48 will open the line 47 regardless of the push button 50 and contact 49, so that the rod string will continue to descend, and hence, cannot be raised to its proper height, so as to restore the normal operating position merely by pushing down the "Up" button 44. Furthermore, opening of the contact 43 by the pressing of the "Up" button 44 will be ineffective because current cannot get through from the line 46 to the cold side 42 of the power line by reason of the fact that the contact 48 has been opened.

The restoration of the circuit to proper condition to enable the raising of the rod string is effected by the No. 3 microswitch (80) which is operated by an adjustable stud 80A (see FIGURE 4) mounted on the upper end of the draw tube 24, and which may be adjusted to operate a little later than the No. 1 microswitch. This No. 3 microswitch 80 has a bottom contact 87 which is normally open and a top contact 88 which is normally closed by being in contact with the arm 89 of the switch connected by means of the line 90 to the cold side 42 of the power line. Hence, when the No. 3 microswitch is actuated, the power line 42 will be connected by means of the line 90 to the contact 87 and the line 46. This will establish a direct connection between the wire 46 and the line 42, so that even though the "Down" button 50 be depressed, the line 46 circuit to the cold side 42 of the power line cannot be opened by pressing down upon the "Up" button 50. Hence, the motor will be restored to its normal balance condition and the descent of the rod string will be arrested.

To restore the entire circuit to its normal operating condition, the "Up" button 44 is then depressed, opening the circuit in the line 40' and taking the short circuit off the shunt between the line 40' and 46. Hence, the motor will commence to operate in a direction to raise the rod string. During the first part of this lifting movement, the microswitch No. 1 (78) is restored to its normal condition by the spring 81a. Subsequently, the switch 80 is reversed by the spring 80b, so that the entire system is then restored in its normal condition, as shown in FIGURE 5.

The No. 2 Microswitch (79)

This No. 2 microswitch is for the purpose of limiting the upward movement of the rod string. This is accomplished by means of a contact 91 which is normally open until it is connected to the branch line 92 by switch arm 93, operated by the push rod 94 when the lower end of the same is engaged by the flange 95 (see FIGURE 2) on the lower end of the draw tube 24.

When the excessive upward movement of the rod string due to over long operation of the "Up" push button 44 has connected contact 91 with line 42, No. 2 microswitch becomes, in effect, short circuited, and the upward movement is accordingly arrested. Then, the only operative button is the "Down" button 50 which can be depressed in order to lower the draw tube sufficiently to open No. 2 switch and thereby restore the whole circuit to the position shown in FIGURE 3.

Any disconnection of the magnetic coupling 22—21 will cause the rod string to drop to its bottom limit and operate the No. 1 microswitch (78), opening contact 48. This will open line 47, having the same effect as pressing "Down" push button 50. This will start the rod motor, and the magnet draw tube will be driven down until No. 3 microswitch (80) is actuated, opening contact between line 90 and contact 88, and closing contact between 90 and 87. The rod motor will then stop. If and when the magnetic coupling circuit has been restored to normal, the rod string can be raised to normal height by pressing the push button 44.

*The Signal Lamps*

In order to advise the operator just what is the condition of the circuit, three signal lamps are provided. The lighting of the MAG UP lamp 96 is for the purpose of indicating when the magnet draw tube has been raised above its normal upper limit. The Contact lamp 97 when lighted indicates that the system is in normal operation, as shown in FIGURE 5. The lamp 98 when lighted indicates that the magnet has been lowered to its lower limit. The lighting of these signal lamps is effected by means of the following circuits.

Referring to FIGURE 5, 99 represents a small transformer for reducing the 110 volt line current to a signal current of 12 volts. One end of the 12 volt winding of the transformer is connected to the cold side 42 of the main 110 volt power line, and the other end of said 12 volt winding is connected to a conductor 100. Between the conductor 100 and the line 42 there are placed three shunt circuits, each containing a 6 volt lamp and an 80 ohm resistance in series. Normally, the only one of said shunt circuits which is effective to show a lighted lamp is the one which controls the contact lamp 97. As to the magnet up lamp 96, this is normally short circuited by the No. 2 microswitch 79.

However, when No. 2 microswitch is actuated, due to excessive upper movement of the rod string, the contact 101, which normally is in contact with the arm 93, is open, thus taking the short circuit off the magnet up lamp 96 and this lamp will light. However, the contact lamp 97 will still remain lighted. When No. 2 microswitch is returned to its normal position, as shown in FIGURE 5, the circuit will be restored, and the 6 volt lamp 96 will be short circuited and extinguished.

The magnet down lamp 98, when lighted, indicates an excessive lowering of the magnet draw tube 24 as a result of emergency or otherwise. When this occurs, the No. 3 microswitch opens the contact between 88 and 90, thus removing a short circuit from the lamp 98. However, when the draw tube is raised, No. 3 microswitch is again restored to its normal position, the connection between the contacts 88 and switch arm 89 is again restored, and the lamp 98 is short circuited and goes out.

In order to put out the normally lighted control lamp 97 when the rod string drops below its bottom limit, No. 1 microswitch (78) has an additional contact 102, which is normally open, but when the microswitch 78 is at its off normal (armature down) position, contact 102 is closed and until No. 3 microswitch is also actuated 102 is thus directly connected to line 90 and the contact lamp 97 is short circuited.

Various of the features of the invention believed to be new are set forth in the appended claims.

We claim:

1. In a nuclear reactor, a remote control means for positioning a vertically movable control rod in a nuclear reactor, said remote control means including an unbalanced element connected to said control rod, a two-phase electric motor having two field windings, gearing connecting said motor to said element for moving said element to a selected rest position, a pair of single phase supply lines, one side of both field windings being coupled to one of said supply lines, a capacitor, one side of said capacitor being coupled to the other side of one of said field windings, the other side of said capacitor being coupled to the other side of said other field winding, first normally closed switch means coupling said other supply line to said one side of said capacitor, second normally closed switch means coupling said other supply line to the other side of said capacitor, and adjustable means coupled to one of said field windings for adjusting the phase of current passing through the same, said adjustable means being adjusted to a value such that the phase difference between currents in the field windings produces a torque in said motor sufficient to neutralize the torque which is applied to the motor through said gearing by the unbalanced weight of said control rod.

2. In a nuclear reactor, a remote control means for positioning a vertically movable control rod in a nuclear reactor, said remote control means including an unbalanced element connected to said control rod, a two-phase electric motor having two field windings, gearing connecting said motor to said element for moving said element to a selected rest position, a pair of single phase supply lines, one side of both field windings being coupled to one of said supply lines, a capacitor, one side of said capacitor being coupled to the other side of one of said field windings, the other side of said capacitor being coupled to the other side of said other field winding, first normally closed switch means coupling said other supply line to said one side of said capacitor, second normally closed switch means coupling said other supply line to the other side of said capacitor, and an adjustable resistor coupled in series with one of said field windings, said resistor being adjusted to a value such that the phase difference between currents in the field windings produces a torque in said motor sufficient to neutralize the torque which is applied to the motor through said gearing by the unbalanced weight of said control rod.

3. In a nuclear reactor, a remote control means for positioning a vertically movable control rod in a nuclear reactor, said remote control means including an unbalanced element connected to said control rod, a two-phase electric motor having two field windings, gearing connecting said motor to said element for moving said element to a selected rest position, a pair of single phase supply lines, one side of both field windings being coupled to one of said supply lines, a capacitor, one side of said capacitor being coupled to the other side of one of said field windings, the other side of said capacitor being coupled to the other side of said other field winding, first normally closed switch means coupling said other supply line to the one side of said capacitor, second normally closed switch means coupling said other supply line to the other side of said capacitor, adjustable means coupled to one of said field windings for adjusting the phase of current passing through the same, said adjustable means being adjusted to a value such that the phase difference between currents in the field windings produces a torque in said motor sufficient to neutralize the torque which is applied to the motor through said gearing by the unbalanced weight of said control rod, a first normally open limit switch means coupled across said first switch means, a second normally open limit switch coupled across said second switch means, means responsive to upward movement of said unbalanced element at a predetermined upper limit position for closing said first limit switch, and means responsive to downward movement of said unbalanced element at a predetermined lower limit position for closing said second limit switch.

4. In a nuclear reactor, a remote control means for positioning a vertically movable control rod in a nuclear reactor, said remote control means including an unbalanced element, means releasably connecting said control rod to said unbalanced element, a two-phase electric motor having two field windings, gearing connecting said motor to said element for moving said element to a selected rest position, a pair of single phase supply lines, one side of both field windings being coupled to one of said supply lines, a capacitor, one side of said capacitor being coupled to the other side of one of said field windings, the other side of said capacitor being coupled to the other side of said other field winding, first normally closed switch means coupling said other supply line to the one side of said capacitor, second normally closed switch means coupling said other supply line to the other side of said capacitor, adjustable means coupled to one of said field windings for adjusting the phase of current passing through the same, said adjustable means being adjusted to a value such that the phase difference between currents in the field windings produces a torque in said motor sufficient to neutralize the torque which is applied to the motor through said gearing by the unbalanced weight of said control rod, a first normally open limit switch means coupled across said first switch means, a second normally open limit switch means coupled across said second switch means, means responsive to upward movement of said unbalanced element at a predetermined upper limit position for closing said first limit switch, means responsive to downward movement of said unbalanced element at a predetermined first lower limit position for closing said second limit switch, third normally closed limit switch means coupled in series with said second switch means, and means responsive to downward movement of said control rod at a predetermined lower position which is higher than said first lower limit position for opening said third limit switch.

5. In a nuclear reactor containing a liquid fluid neutron moderating material, and a reactive core within the moderating material, the combination of a control rod which is movable up and down in a controlled path in the core, with and against the force of gravity, and remote control means for positioning said control rod in the core, said remote control means including an unbalanced element, a lifting electromagnet mounted on the lower end of said unbalanced element, an armature for said magnet, a rod means for connecting the reactor control rod with the armature, said rod means being long enough so that when the electromagnet is deenergized to drop the armature, the armature remains above the level of the fluid, a two-phase electric motor having two field windings, gearing connecting said motor to said element for moving said element in said path in either desired direction to a selected rest position, a pair of single phase supply lines, one side of both field windings being coupled to one of said supply lines, a capacitor, one side of said capacitor being coupled to the other side of one of said field windings, the other side of said capacitor being coupled to the other side of said other field winding, first switch means coupling said other supply line to said one side of said capacitor, second switch means coupling said other supply line to the other side of said capacitor, and adjustable means coupled to one of said field windings for adjusting the phase of current passing through the same, said adjustable means being adjusted to a value such that the phase difference between currents in the field windings produces a torque in said motor sufficient to neutralize the torque which is applied to the motor through said gearing by the unbalanced weight of said control rod.

References Cited in the file of this patent
UNITED STATES PATENTS

| | | |
|---|---|---|
| 2,099,576 | Schiebler | Nov. 16, 1932 |
| 2,182,624 | Dreyer | Dec. 5, 1939 |
| 2,242,343 | Buchanan | May 20, 1941 |
| 2,597,408 | Thompson | May 20, 1952 |
| 2,708,256 | Colt | May 10, 1955 |
| 2,864,048 | Newell | Dec. 9, 1958 |
| 2,880,155 | Lichtenberger et al. | Mar. 31, 1959 |
| 2,917,445 | Oakes et al. | Dec. 15, 1959 |
| 2,990,356 | Chapellier | June 27, 1961 |

OTHER REFERENCES

Nuclear Power, I (November 1956), pp. 283–286.

G.E.C. Atomic Energy Review, vol. 1, March 1957, pp. 40–44.

AECD–3840, Feb. 14, 1954, declass. Dec. 9, 1955, pp. 14–18, 69, 70 and 80.

Schultz: Control of Nuclear Reactor and Power Plants, McGraw-Hill Book Co., New York, 1955, pp. 101–103.

Progress in Nuclear Energy, Series II, "Reactors," editors: Charpie et al., McGraw-Hill, 1956, pp. 159–167.

Nucleonics, vol. 13, No. 6, June 1955, article by Harrer, pages 50–51.